(12) United States Patent
Margheritis et al.

(10) Patent No.: US 9,902,651 B2
(45) Date of Patent: Feb. 27, 2018

(54) JOINT COMPOUNDS

(71) Applicant: LAMBERTI SPA, Albizzate (VA) (IT)

(72) Inventors: Giampietro Margheritis, Caravate (IT); Barbara Biasotti, Gallarate (IT); Barbara Gatti, Legnano (IT); Roberto Coarezza, Castronno (IT); Valentina Langella, Milan (IT); Giovanni Floridi, Novara (IT); Giuseppe Li Bassi, Gavirate (IT)

(73) Assignee: LAMBERTI SPA, Albizzate (VA) (IT)

( * ) Notice: Subject to any disclaimer, the term of this patent is extended or adjusted under 35 U.S.C. 154(b) by 0 days.

(21) Appl. No.: 15/126,216

(22) PCT Filed: Mar. 12, 2015

(86) PCT No.: PCT/EP2015/055157
§ 371 (c)(1),
(2) Date: Sep. 14, 2016

(87) PCT Pub. No.: WO2015/136031
PCT Pub. Date: Sep. 17, 2015

(65) Prior Publication Data
US 2017/0081245 A1    Mar. 23, 2017

(30) Foreign Application Priority Data

Mar. 14, 2014 (IT) .............. VA2014A0010

(51) Int. Cl.
| | | |
|---|---|---|
| C04B 24/38 | (2006.01) |
| C04B 14/00 | (2006.01) |
| C04B 26/02 | (2006.01) |
| C04B 26/06 | (2006.01) |
| C04B 14/28 | (2006.01) |
| C04B 111/00 | (2006.01) |
| C04B 103/00 | (2006.01) |
| C04B 103/44 | (2006.01) |

(52) U.S. Cl.
CPC ............. C04B 24/38 (2013.01); C04B 14/28 (2013.01); C04B 26/02 (2013.01); C04B 26/06 (2013.01); *C04B 2103/0052* (2013.01); *C04B 2103/44* (2013.01); *C04B 2111/00681* (2013.01)

(58) Field of Classification Search
None
See application file for complete search history.

(56) References Cited

U.S. PATENT DOCUMENTS

| | | | | |
|---|---|---|---|---|
| 5,512,616 A | * | 4/1996 | Podlas ................ | C09K 3/1015 106/162.8 |
| 2005/0235878 A1 | * | 10/2005 | Podlas ................ | B63H 3/008 106/618 |
| 2007/0213230 A1 | * | 9/2007 | Pfeiffer ............... | C08B 37/0096 507/204 |
| 2013/0225732 A1 | * | 8/2013 | Bakeev ................ | C09J 101/04 524/44 |
| 2014/0135420 A1 | * | 5/2014 | Podlas ................ | C04B 24/2623 523/122 |

FOREIGN PATENT DOCUMENTS

| | | | | |
|---|---|---|---|---|
| WO | WO 2011137218 A1 | * | 11/2011 | ............. A61K 8/737 |
| WO | WO 2012089530 A1 | * | 7/2012 | ............ C04B 28/145 |
| WO | WO 2012127067 A2 | * | 9/2012 | ............. C04B 24/38 |

* cited by examiner

*Primary Examiner* — Vu A Nguyen
(74) *Attorney, Agent, or Firm* — Mossman, Kumar & Tyler, PC

(57) ABSTRACT

The present invention relates to ready-to-use drying joint compounds that exhibit improved performance characteristics due to the presence of a hydrophobically modified polygalactomannan.

18 Claims, No Drawings

JOINT COMPOUNDS

TECHNICAL FIELD

The present invention relates to joint compounds, in particular to drying joint compounds, that exhibit improved performance characteristics due to the presence of a hydrophobically modified polygalactomannan.

BACKGROUND OF THE ART

Joint compounds or tape joint compounds are paste-like materials typically used in the construction of interior walls. In general, they are applied at the joint between two adjacent wall board panels or in cracks or holes in existing walls. The purpose of the joint compound is then to form a monolithic and regular surface for subsequent painting.

In general, there are two types of joint compound: 1) drying and 2) setting.

Drying joint compounds harden when they dry by evaporation; setting joint compounds are mixed with water immediately before use and sets through a chemical hardening process rather than evaporation.

Drying joint compounds are typically ready-to-use (or ready-mixed), that is in the form of aqueous pastes containing inert inorganic fillers; limestone (a sedimentary rock composed largely of calcium carbonate minerals) is the predominant inorganic filler in drying joint compounds.

Water is already well mixed with the inorganic filler, which is inert, i.e. not able to react with water, and upon application, the water evaporates to the atmosphere.

Drying joint compounds can be also provided in dry form, but usually they are sold as ready-to-use mix.

On the other hand, setting joint compounds are only sold in powder form and comprise inorganic fillers which react with water (hydraulic binders); water must be always added at the job site.

Typically, all joint compounds contain a filler, a binder and a thickener.

The conventional fillers are calcium carbonate, calcium sulfate dihydrate (gypsum), and calcium sulfate hemihydrate (plaster of Paris).

Calcium carbonate and calcium sulfate dihydrate (gypsum) are inert inorganic filler and can be used in ready-to-use drying joint compounds.

Since it reacts with water, calcium sulfate hemihydrate is used only in setting type joint compound. Usually, in current construction practices, it is preferred to use a ready-mixed or pre-wetted joint compound, which contains either a calcium carbonate and/or gypsum filler.

As mentioned above, most commercial joint compound formulations contain a thickener. Thickeners are used in numerous products particularly for increasing viscosity and imparting the required rheological properties to the products.

The thickeners for joint compounds can be natural polymers, such as guar or xanthan; synthetic polymers, such as polyacrylate or polyurethane based thickener; or semi-synthetic polymers, or chemically modified natural polymers, such as cellulose derivatives; all exhibiting the specific characteristic of bonding and coordinating a large amount of water once they are dissolved in water.

Among the chemically modified natural polymers, the thickeners of choice have been for a long time the derivatives of cellulose, including carboxymethyl cellulose (CMC), hydroxyethyl cellulose (HEC), ethyl hydroxyethyl cellulose (EHEC), methyl cellulose (MC), hydroxyethyl methyl cellulose (MHEC), hydroxypropyl methyl cellulose (HPMC) ethers alone and blends of them.

Hydroxypropyl guar is also known as thickener for joint compounds, as described in U.S. Pat. No. 5,512,616. Like the cellulose derivatives it modifies the viscosity and rheology of the joint compounds by imparting pseudoplastic behaviour to the paste.

In recent years, associative chemically modified natural polymers have been used, such as hydrophobically modified hydroxyethyl cellulose. This technical solution has been described in U.S. Pat. No. 5,258,069 or U.S. Pat. No. 5,102,462. Now, it has been surprisingly found that $C_3$-$C_{24}$ hydrophobically modified polygalactomannans impart improved workability and long-term stability to joint compounds, in particular to ready-to-mix drying joint compounds, compared to the prior art thickener, while simultaneously maintaining water retention, sag resistance, and other important properties.

As far as the Applicant knows, no one has described the use of $C_3$-$C_{24}$ hydrophobically modified polygalactomannans in joint compounds, in particular in ready-to-mix drying joint compounds.

In the present text, with the expression "$C_3$-$C_{24}$ hydrophobically modified polygalactomannan" we mean a polygalactomannan which has been modified with the introduction, as substituent, of an unsubstituted linear or branched alkyl chain with from 3 to 24 carbon atoms.

With the expression "molar substitution" (MS), we mean the average number of hydroxyalkyl substituents on each anhydroglycosidic unit of the polygalactomannan, which can be measured, for example, by $^1$H-NMR.

With the expression "degree of substitution" (DS), we mean the average number of substituted hydroxyl groups on each anhydroglycosidic unit of the polygalactomannan, which can be measured, for example, by $^1$H-NMR.

DESCRIPTION OF THE INVENTION

It is therefore an object of the present invention a method for the preparation of joint compounds comprising the step of adding, to at least one filler and at least one binder, a $C_3$-$C_{24}$ hydrophobically modified polygalactomannan having a hydrophobic degree of substitution comprised between $10^{-5}$ and $5 \cdot 10^{-1}$, at a concentration of from 0.03 to 5% by weight (% wt), preferably from 0.2 to 3% wt, based on the final joint compound, the joint compounds comprising from 35 to 70% wt of filler; from 1 to 5% wt of binder and from 10 to 45% wt of water.

Furthermore, another object of the present invention is a joint compound comprising from 35 to 70% wt, preferably from 47 to 68% wt of at least one filler, from 1.0 to 5% wt at least one binder and from 0.2 to 3% by weight of a $C_3$-$C_{24}$ hydrophobically modified polygalactomannan having hydrophobic degree of substitution comprised between $10^{-5}$ and $5 \cdot 10^{-1}$ and from 25 to 45% wt of water.

DETAILED DESCRIPTION OF THE INVENTION

Being water-based, the joint compound of the invention is a ready-to-use drying joint compound, i.e. it does not contain hydraulic binders, but only inert inorganic fillers.

Typically, the joint compounds prepared following the method of the invention, beside from 0.2 to 3% wt of the thickening agent, contain from 35 to 70% wt, of at least one inorganic inert filler; from 1 to 5% wt of binder and from 10 to 45% wt, of water.

The use of compositions comprising from 35 to 70% wt, preferably from 47 to 68% wt of at least one inorganic inert filler, from 1.0 to 5% wt at least one organic binder and from 0.2 to 3% by weight of a $C_3$-$C_{24}$ hydrophobically modified polygalactomannan having hydrophobic degree of substitution comprised between $10^{-5}$ and $5 \cdot 10^{-1}$ and from 25 to 45% wt of water, to seal joints between sheets of drywalls, primarily in building construction, is another object of the present invention.

Any kind of polygalactomannan can be used to prepare the $C_3$-$C_{24}$ hydrophobically modified polygalactomannan of the invention.

Polygalactomannans having different average D-mannosyl to D-galactosyl unit ratio are widely commercially available. Among those, guar gum, tara gum, carob gum, cassia gum and fenugreek gum are particularly suitable for the realization of the present invention.

The polysaccharide molecule of guar has an average molar ratio mannose:galactose of about 2:1. The polygalactomannan from tara (tara gum) has average ratio of approximately 3:1, the one from locust bean (locust bean gum) has a ratio of about 4:1, the one from cassia (cassia gum) of about 5:1 and the polygalactomannan from fenugreek (fenugreek gum) of about 1:1.

Guar gum, or simply guar, is a polysaccharide which consists of a main linear chain of poly-mannose bearing branches of galactose units and is extracted from a leguminosae, "Cyamopsis Tetragonolobus", that grows in the semi-dry region of tropical countries, such as in India and in Pakistan.

Tara gum is obtained from the kernels of the tara shrub *Caesalpinia spinosa*, sometimes referred to as *Caesalpinia tinctoria* or *Caesalpinia pectinata*. This legume is native of northern regions of Africa and South America. Peru is the primary source of tara gum.

In tara gum the nature of D-galactosyl distribution along the mannan chain has not been fully elucidated, although its rheological behaviour, and in particular its synergy with xanthan gum, suggests a certain degree of block structure of the galactose substitution.

Locust bean gum (or carob gum) is the refined endosperm of the seed of the carob tree, which is known botanically as *Ceratonia siliqua* L. The tree mainly grows in Mediterranean countries. Locust bean gum has fewer D-galactosyl side groups than does tara gum, with a D-mannosyl to D-galactosyl unit ratio averaging about 4:1. The D-galactosylside groups are clustered in blocks of about 25, thus creating long regions of unsubstituted mannan backbone. This peculiar structure is believed to account for the relevant differences in properties between guar gum and locust bean gum. By way of example, differently from guar, locust bean gum is only slightly soluble in cold water.

Cassia gum derives from the endosperm of *Cassia obtusifolia* also known as *Senna obtusifolia* or *Cassia tora*. *Cassia obtusifolia, Caesalpiniaceae*, is a wild crop and grows in most parts of India as a weed. Cassia grows in hot, wet, tropical climates both wild and commercially. Cassia gum is not soluble in cold water and it forms low viscosity solutions in water only by swelling in water after it is heated.

On the other hand, fenugreek gum is soluble in cold water but provides aqueous solutions with relatively low viscosities too. Fenugreek gum is a polygalactomannan extracted from the seeds of fenugreek plant (*Trigonella foenum-graecum*). Fenugreek is an erect annual herb of the bean family that is indigenous to western Asia and southeastern Europe.

The different characteristics of the above described galactomannans appear in the following table:

| | Approx. D-mannosyl to D-galactosyl unit ratio | Solubility in water at 25° C. (1% wt) | Solubility in water at 85° C. (1% wt) | Viscosity 1% wt in water* (mPa * s) |
|---|---|---|---|---|
| Fenugreek gum | 1:1 | complete | complete | 1850 |
| Guar gum | 2:1 | complete | complete | 5000 |
| Tara gum | 3:1 | 80% | complete | 5800 |
| Locust bean gum | 4:1 | 15% | complete | 2940 |
| Cassia gum | 5:1 | Non soluble | complete | 150 |

*Brookfield ® viscosity at 20 rpm, 20° C. after complete dissolution

Although guar gum, tara gum, locust bean gum, cassia gum and fenugreek gum all belong to the polygalactomannan family, each of them show a peculiar rheology and even different solubility in water.

Nonetheless, it has surprisingly been found that they are all suitable for the preparation of hydrophobically modified derivatives, that can be used advantageously as rheology modifiers in joint compounds, particularly in ready-to-use drying joint compounds.

The process for the preparation of $C_3$-$C_{24}$ hydrophobically modified polygalactomannans is known in the art, by way of example it is described in EP 323627 and EP 1786840.

Usually it comprises the following steps:
a. the galactomannan is treated with an alkaline catalyst in water or in a water/water-soluble solvent mixture;
b. an hydrophobizing agent is introduced into the mixture, possibly dispersed in an organic solvent;
c. at the end of the reaction, the alkaline catalyst is neutralized, the possible organic solvent is distilled off and the product obtained is dried, ground and sieved to obtain a hydrophobically modified galactomannan derivative.

Suitable water-soluble solvents for the process can be methanol, ethanol and secondary lower alkanols, such as isopropanol, sec-butanol, sec-amyl alcohol, or tertiary lower alkanols. Preferably, the water-soluble solvent is isopropanol.

The alkaline catalysts are in general alkali metal or alkaline earth metal hydroxides, such as sodium, potassium or calcium hydroxide.

Suitable hydrophobizing agents include alkyl halides and epoxides, such as alkyl epoxides and alkyl glycidyl ethers, that contain a $C_3$-$C_{24}$ hydrocarbon group.

A glycidylether, suitable as hydrophobizing agent, can be, for example, butyl glycidyl ether, t-butyl glycidyl ether, 2-ethylhexyl glycidyl ether, dodecyl glycidyl ether, hexadecyl glycidyl ether, behenyl glycidyl ether, phenyl glycidyl ether, benzyl glycidyl ether, triphenylmethyl glycidyl ether, nonylphenyl glycidyl ether and allyl glycidyl ether.

Representative alkyl epoxides include but are not limited to 1,2-epoxyethylbenzene, 1,2-epoxybutane, 1,2-epoxypentane, 1,2-epoxyhexane, 1,2-epoxyoctane, 1,2-epoxydecane, 1,2-epoxy dodecane, 1,2-epoxytetradecane, 1,2-epoxy hexadecane, 1,2-epoxyoctadecane and 1,2-epoxyeicosane.

Exemplary halide hydrophobizing agents include but are not limited to propyl, isopropyl, n-butyl, t-butyl, pentyl, neopentyl, hexyl, octyl, 2-ethylhexyl, decyl, dodecyl, myristyl, hexadecyl, stearyl and behenyl bromides, chlorides, and iodides.

The hydrophobically modified polygalactomannan of the invention may have hydrophobic degree of substitution (DS) of from $1 \cdot 10^{-5}$ to $5 \cdot 10^{-1}$, preferably from $1 \cdot 10^{-4}$ to $1 \cdot 10^{-1}$.

The hydrophobically modified polygalactomannans of the invention contain $C_3$-$C_{24}$, preferably a $C_6$-$C_8$, hydrophobic chain.

More preferably the hydrophobic group is a 2-ethylhexyl chain.

The polygalactomannan of the invention can be further reacted with a etherifying agent, usually before the hydrophobic modification.

Suitable etherifying agents for the realization of the invention can be alkylene oxides, e.g., ethylene oxide, propylene oxide, butylene oxide to obtain $C_3$-$C_{24}$ hydrophobically modified hydroxyalkyl polygalactomannans, such as $C_3$-$C_{24}$ hydrophobically modified hydroxypropyl polygalactomannans.

Halo-carboxylic acids, such as monochloroacetic acid or its salts, can be used for the preparation of hydrophobically modified carboxyalkyl ethers. Tertiary amino or quaternary ammonium alkylating reagents such as 2-dialkylaminoethyl chloride, 3-chloro-2-hydroxypropyltrimethyl ammonium chloride and 2,3-epoxy-propyltrimethyl ammonium chloride can be used to prepare hydrophobically modified cationic ethers of polygalactomannans.

Mixed ethers can be prepared adding mixtures of the mentioned etherifying agents, i.e. propylene oxide and monochloroacetic acid.

More specific details about the preparation of the hydrophobically modified polygalactomannan suitable for the realization of the present invention can be found in the literature, for example, in "Industrial Gums: Polysaccharides and their Derivatives", 3rd Ed., Whistler, Roy L., and BeMiller, James N., Academic Press (1993).

The $C_3$-$C_{24}$ hydrophobically modified hydroxyalkyl ethers of polygalactomannan may have hydroxyalkyl molar substitution (MS) comprised between 0.1 and 3.0, preferably between 0.2 and 2.0, more preferably between 0.5 and 1.8.

The $C_3$-$C_{24}$ hydrophobically modified carboxyalkyl polygalactomannans may have an anionic degree of substitution ($DS_A$) from 0.1 to 1.5, preferably from 0.1 to 1.0.

The mixed hydroxyalkyl and carboxymethyl ethers may have a MS and $DS_A$ comprised in the same range of the mono-ethers.

The $C_3$-$C_{24}$ hydrophobically modified cationic ethers may have a cationic degree of substitution ($DS_C$) of from 0.05 to 1.5.

In a preferred embodiment, the $C_3$-$C_{24}$ hydrophobically modified polygalactomannan has been treated during the preparation process with a small amount of crosslinking agent and thus contains from 0.01 to 3.0 by weight, preferably from 0.1 to 2.0% by weight, of crosslinking agent. The preferred crosslinking agent is glyoxal.

A 2% by weight aqueous solution of the $C_3$-$C_{24}$ hydrophobically modified polygalactomannan to be used in the invention preferably exhibits a RVT Brookfield® viscosity not lower than 500 mPa·s at 20° C. and 20 rpm. The hydrophobically modified polygalactomannans of the disclosure preferably passes for 95% of their weight through a 60 mesh standard sieve.

For the realization of the present invention, $C_3$-$C_{24}$ hydrophobically modified hydroxypropyl guar and $C_3$-$C_{24}$ hydrophobically modified hydroxypropyl cassia are the preferred $C_3$-$C_{24}$ hydrophobically modified polygalactomannans.

According to one of the preferred embodiments of the invention the $C_3$-$C_{24}$ hydrophobically modified polygalactomannan is a hydroxyalkyl guar or hydroxyalkyl cassia ether that comprise unsubstituted linear or branched $C_6$-$C_8$ alkyl chains having a hydrophobic degree of substitution from 0.005 to 0.10.

Specially preferred $C_3$-$C_{24}$ hydrophobically modified polygalactomannans are 2-hydroxypropyl-2-hydroxy-3-(2-ethylhexyloxy) propyl guar and 2-hydroxypropyl-2-hydroxy-3-(2-ethylhexyloxy) propyl cassia gum.

Another advantage of the $C_3$-$C_{24}$ hydrophobically modified polygalactomannans of the present invention is the fact that they can be used in crude form as they guarantee good performances without the need of a purification step after their preparation, and, as a consequence, they are obtainable at a substantially low factory cost.

In a preferred embodiment the joint compound of the invention contain from 0.03 to 5% by weight, preferably from 0.2 to 3% wt of an additional thickener, the ratio by weight between the $C_3$-$C_{24}$ hydrophobically modified polygalactomannan and the additional thickener should be in the range between 20/80 and 80/20, preferably between 25/75 and 60/40. Examples of additional thickeners, which may also be utilized in these drying joint compounds, are: cellulose derivatives, such as carboxymethyl cellulose (CMC), hydroxyethyl cellulose (HEC), ethyl hydroxyethyl cellulose (EHEC), methyl cellulose (MC), methyl hydroxyethyl cellulose (MHEC), hydroxypropyl methyl cellulose (HPMC), hydrophobically modified hydroxyethyl cellulose (HM-HEC); polygalactomannans or polygalactomannans derivatives, such as carboxymethyl guar, hydroxypropyl guar and hydroxypropyl cassia; dextrins or cyclodextrins, starch and starch derivatives, especially degraded starch, xanthan, polyacrylates, polyetherpolyols or polyurethane derivatives, partially hydrolysed polymers of vinyl acetate, which are hydrolysed to the extent of more than 70%, and/or vinyl alcohol copolymers, preferably copolymers of vinyl acetate and alkylvinyl ester, which are partly or fully saponified, and also polyvinyl alcohol itself, polymers of N-vinylpyrrolidone or its copolymers with vinyl esters. Preferred additional thickeners are cellulose derivatives and carboxymethyl cellulose and hydroxyethyl cellulose are particularly preferred.

Any inert filler suitable for use in a drying joint compound can be used in the joint compound according to the invention. The preferred filler that is used in the present invention is calcium carbonate.

Additional fillers, which can also be used to impart specific properties to the joint compound, are mica, talc, diatomaceous earths, non swellable clays (such as attapulgite, sepiolite and kaolin), natural anhydrite, pyrophyllite, and mixture thereof. Mica reduces cracking of the joint compounds as it dries and, usually, it is also preferred to add clay to improve the body and workability of the joint compounds.

Organic inert fillers may also be present in the joint compounds of the invention. Examples of organic fillers include polymeric powders and those known as hollow spheres.

If the joint compound is preferred to be a lightweight, ready-mixed joint compound, the lightweight or low density property can be provided by incorporating an expanded perlite into the base joint compound. The perlite can be a silicone or silane treated expanded perlite.

The binder may be any standard type organic binder and may include different binder materials. Preferred binders are water-soluble, water-dispersible or water-emulsifiable binders that can be natural, natural-modified or synthetic.

Examples of natural binders include natural resins, such as rosin or schellac, natural oils, especially oils containing fatty acids which are saturated or contain various degrees of unsaturation, said oils being oxidatively drying if desired, such as linseed oil, soya oil, castor oil, and the like. Other natural materials that are useful as binders include starch and casein.

Natural-modified binders are, in particular, chemically modified natural resins, e.g. rosin-maleate resin, and also modified oils, e.g. isomerized oils, styrenated and acrylated oils, and also cellulose derivatives such as cellulose nitrates, cellulose esters of organic acids.

Examples of synthetic binders are saturated polyesters obtained by polyesterifying bifunctional or higher polyfunctional alcohols with polyfunctional saturated-aliphatic, cyclo-aliphatic or aromatic carboxylic acids and/or their anhydrides. Further synthetic organic binders are alkyd resins (polyesters modified with unsaturated fatty acids, fatty oils or higher synthetic carboxylic acids) and chemically modified alkyd resins, examples being styrenated, acrylated or urethanized.

Further suitable synthetic binders include acrylic resins (polyacrylates) in the form of their homopolymers and copolymers, e.g. styrene acrylate and polyacrylic polyols or vinyl resins, such as polyvinyl alcohol, polyvinyl acetate and ethylene-vinyl acetate copolymers. Acrylic resins or vinyl resins are particularly preferred.

As additives, the joint compound of the invention may comprise surface-active agents and defoamers. Surface-active agents used are preferably dispersants, wetting agents and emulsifiers as widely used in the sector.

In particular, they may be nonionic, anionic, cationic or amphoteric, and monomeric or polymeric, in nature. Specific examples are lecithin-based products and monoglycerides.

Suitable defoamers include those based on natural oils or mineral oils, chemically modified silicones and silica materials.

Certain suitable thixotropic agents may also be included within these joint compounds as well. These would include, without limitation, pyrogenic silicas, and organic compounds based, for example, on high molecular mass polyolefins, hydrogenated castor oil, polyamides or polyacrylates.

Other ingredients, which may be used in the joint compounds of the invention, include dispersants, air entraining agents, humectants, pH buffering salts, stabilizers and biocides.

The joint compounds provided by the invention are usually prepared by first combining all dry ingredients, among which the $C_3$-$C_{24}$ hydrophobically modified polygalactomannan, in a powder mixer. Water and any additional liquid ingredients are then combined with the dry mixture, either at the point of manufacture or at the time of use. Alternatively, most of the liquid components are added to a blender, after which the dry ingredients are added.

The joint compound described above is useful in finishing of joints for new construction as well as patching cracks or holes in existing walls.

EXAMPLES

Table 1 shows the hydrophobically modified polygalactomannans which have been utilized for the preparation of drying joint compounds of the Examples.

$C_8$ and $C_{16}$ hydrophobically modified hydroxypropyl polygalactomannans were prepared using 2-ethylhexyl glycidyl ether and hexadecyl glycidyl ether as hydrophobizing agents.

The performances and stability of the thickeners of the present invention were compared with the same properties of hydroxypropyl polygalactomannans and a hydrophobically modified ($C_{16}$) hydroxyethyl cellulose.

The RVT Brookfield® viscosities of the thickeners were determined in a 2 by weight aqueous solutions at 20° C. and 20 rpm.

MS (hydroxypropyl) and DS (carboxymethyl and ethylhexyl) were determined by $^1$H-NMR. The degree of hydrophobic $C_{16}$ substitution was determined by applying the Zeisel method (K. L. Hodges, W. E. Kester, D. L. Wiederrich, and J. A. Grover, Determination of Alkoxyl Substitution in Cellulose Ethers by Zeisel-Gas Chromatography, Analytical Chemistry, Vol. 51 (No. 13), November (1979) pp. 2172-2176).

TABLE 1

| Thickener | Thickener Identity | MS | DS | Viscosity (mPa * s) |
|---|---|---|---|---|
| HPG* | Hydroxylpropyl Guar | 0.9 | — | 12500 |
| EHHPG | Hydroph. Mod. ($C_8$) Hydroxypropyl Guar | 1.7 | 0.03 | 9000 |
| HMHPG | Hydroph. Mod. ($C_{16}$) Hydroxypropyl Guar | 1.2 | 0.0005 | 9000 |
| HPCa* | Hydroxypropyl Cassia | 1.3 | — | 3000 |
| EHHPCa | Hydroph. Mod. ($C_8$) Hydroxypropyl Cassia | 1.7 | 0.05 | 7600 |
| HMHPCa | Hydroph. Mod. ($C_{16}$) Hydroxypropyl Cassia | 1.1 | 0.0011 | 5200 |
| HPF* | Hydroxylpropyl Fenugreek | 0.6 | — | 5340 |
| EHHPF | Hydroph. Mod. ($C_8$) Hydroxypropyl Fenugreek | 1.5 | 0.024 | 262** |
| EHHPT | Hydroph. Mod. ($C_8$) Hydroxypropyl Tara | 1.7 | 0.030 | 530** |
| EHHPL | Hydroph. Mod. ($C_8$) Hydroxypropyl Locust Bean | 1.8 | 0.03 | 6270 |
| HMHEC* | Hydroph. Mod. ($C_{16}$) Hydroxyethyl Cellulose | 4 | 0.0027 | 4000 |

*comparative
**viscosity on 1% wt aqueous solution

The properties of the thickeners of the invention were evaluated on drying joint compounds comprising the commercially available ingredients reported in Table 2.

TABLE 2

| | Ingredients | % wt |
|---|---|---|
| Phase A | Water | Up to 100 |
| | Biocide | 0.2 |
| | Antifoam | 0.1 |
| Phase B | Thickener | 0.45 |
| | Attapulgite | 2 |
| | Crystalline CaCO3 | 62.5 |
| | Mica | 1.5 |
| Phase C | Stirene-Acrylic binder | 1.45 |

For each thickener 1200 grams of joint compound were prepared according to the following procedure:
- all the ingredients of phase B were weighed in a plastic bag and homogenized by shaking;
- all the ingredients of phase A were weighed in a plastic beaker and mixed stirring gently using a mechanical stirrer;
- after 2 minutes, the ingredients of the phase B was gradually poured into the becker in 1 minute and dispersed at low speed for 15 minutes;
- at the end of the dispersion the binder was introduced into the mixture, as the last ingredient;
- after 5 minutes of homogenization each joint compounds was cooled at room temperature.

24 hours later, each joint compound was divided in two aliquots that were stored at 20° C. and 50° C., respectively.

Table 3 reports the storage stability, the pseudoplasticity index (PI), the yield stress ($\tau_0$) and the "workability" of the drying joint compounds.

The storage stability was determined by comparison of the Brookfield® RVT viscosity at 24 hours $V_0$ (20 rpm and 20° C.) with the viscosity determined after 15 days on the samples stored at 50° C. ($V_{15}$). A low difference ($\Delta\%$) between $V_0$ and $V_{15}$ is a demonstration of high stability of the thickener in the joint compounds.

The pseudoplasticity index, which is correlated with applicability of the drying joint compound, is calculated with the following formula:

$$PI = (VB_{100}/VB_{0.5}) \cdot 100$$

where $VB_{100}$ and $VB_{0.5}$ are the Brookfield® RVT viscosities measured at 20° C. and 100 and 0.5 rpm, respectively. A higher value is an index of a superior applicability.

The yield stress is defined as the stress that has to be applied to the sample before it starts to flow. Below the yield stress the sample will deform elastically and above the yield stress the sample will flow like a liquid.

This parameter can be related to the joint compound's workability: a joint compound with a lower yield stress is expected to be easier to be applied.

The determination of yield stress ($\tau_0$) was performed with a rheological oscillatory test.

The changes in the storage modulus (G') and loss modulus (G") were monitored with increasing the shear stress.

It is known that, at low oscillation frequencies, G' and G" are constant until a certain stress value, called yield stress value, and after this point they decrease.

The index "Workability" indicates the easiness of application of the joint filler. Table 3 reports using a scale from 1 to 5 the subjective feelings of a user of the joint compounds, such as good adhesion to the substrate, consistency, smoothness and creaminess.

This index was evaluated by manually shaking the compound in a jar and by manual application on a plasterboard.

The joint compounds with better feelings were assigned a value of 5 and the joint compounds with worse feelings were assigned a value of 1.

TABLE 3

| Joint Compound | Thickener | $V_0$ (Pa·s) | $V_{15}$ (Pa·s) | $\Delta\%$ | PI | $\tau_0$ (Pa) | Workability |
|---|---|---|---|---|---|---|---|
| 1* | HPG | 31.8 | 36 | 13 | 1.1 | 20 | 2 |
| 2 | EHHPG | 40.1 | 44 | 10 | 2.0 | 9 | 3 |
| 3 | HMHPG | 34.8 | 37.2 | 7 | 1.8 | n.d. | 4 |
| 4* | HPCa | 57 | 60.4 | 6 | 2.6 | 15 | 2 |
| 5 | EHHPCa | 63 | 62.2 | −1 | 3.8 | 10 | 5 |
| 6 | HMHPCa | 59 | 61.8 | 5 | 2.7 | n.d. | 4 |
| 7* | HPF | 33 | 36 | 9 | 1.2 | n.d. | 2 |
| 8 | EHHPF | 36.2 | 39.2 | 9 | 3.0 | n.d. | 5 |
| 9 | EHHPT | 48 | 50.5 | 5 | 2.4 | n.d. | 5 |
| 10 | EHHPL | 51.2 | 54.2 | 6 | 2.2 | n.d. | 5 |
| 11* | HMHPC | 65 | 56.6 | −13 | 4.2 | 9 | 4 |

*Comparative
n.d. = not determined

The results show that hydrophobically modified polygalactomannans of the invention have, in drying joint compounds, a higher stability compared to the hydrophobically modified cellulose and an applicative behaviour comparable or better than those of corresponding polygalactomannans.

More thickening agent were prepared by mixing some of the hydrophobically modified polygalactomannans of the invention described in Table 1 with a commercial carboxymethyl cellulose.

Table 4 reports the characteristics of the cellulose derivative (DS and Brookfield® RVT viscosity in 2% water solution at 20° C. and 20 rpm) together with the viscosity ($V_0$) of a drying joint compound prepared as described in previously containing 0.45% by weight of this thickener.

TABLE 4

| Thickener | Thickener Identity | DS | Viscosity (Pa * s) | $V_0$ (Pa * s) |
|---|---|---|---|---|
| CMC | Carboxymethyl Cellulose | 0.85 | 4.8 | 66 |

The mixtures were prepared by simply mixing the powders in plastic bags. The amount of thickeners utilized for the preparation of the mixtures Mix1-Mix5 are reported in Table 5.

TABLE 5

| Mixture of Thickeners | Thickeners | EHHPL % wt | CMC % wt | EHHPCa % wt | EHHPF % wt | EHHPG % wt | HMHEC % wt |
|---|---|---|---|---|---|---|---|
| Mix1 | EHHPG/CMC | | 25 | | | 75 | |
| Mix2 | EHHPCa/CMC | | 25 | 75 | | | |
| Mix3 | EHHPF/CMC | | 25 | | 75 | | |
| Mix4 | EHHPL/CMC | 75 | 25 | | | | |
| Mix 5* | HMHEC/CMC | | 25 | | | | 75 |

*Comparative

Each mixture was used in the preparation of drying joint compounds with the same composition as reported in Table 2 and the same procedure described above.

The RVT Brookfield® viscosity ($V_0$) of the drying joint compounds was determined at 20° C. and 20 rpm 24 hours after the preparation.

The results are reported in Table 6 together with the % increase of the viscosity (% Gain) calculated with the following formula:

$$\text{Gain} = (V_0 - V_t)/V_t \cdot 100$$

where $V_t$ is the theoretical viscosity calculated as sum of the viscosity of each component of the mixture weighed for the component concentration in the mixture.

TABLE 6

| Mixture of Thickeners | Thickener | Thickener (% wt) | $V_0$ (Pa · s) | $V_t$ (Pa · s) | % Gain |
|---|---|---|---|---|---|
| Mix1 | EHHPG/CMC | 0.45 | 60 | 46.6 | 29 |
| Mix2 | EHHPCa/CMC | 0.45 | 77 | 62.7 | 23 |
| Mix3 | EHHPF/CMC | 0.45 | 56 | 44.8 | 25 |
| Mix4 | EHHPL/CMC | 0.45 | 90 | 56.6 | 59 |
| Mix5* | HMHEC/CMC | 0.45 | 55 | 69.8 | −16 |

*comparative

The results show that the hydrophobically modified polygalactomannans interact positively with cellulosic thickeners, synergistically increasing the viscosity of the drying joint compounds compared with the single thickeners.

The invention claimed is:

1. A method or preparing a drying joint compound comprising adding to at least one filler and one binder a $C_3$-$C_{24}$ hydrophobically modified polygalactomannan having a hydrophobic degree of substitution of from about $10^{-5}$ and about $5*10^{-1}$ wherein:
    the joint compound comprises from about 35 to about 70% wt of filler;
    the joint compound comprises from about 1 to about 5% wt of binder;
    the joint compound comprises from about 10 to about 45% wt of water; and
    the $C_3$-$C_{24}$ hydrophobically modified polygalactomannan is present at a concentration of from about 0.2 to about 5% by weight (% wt) based upon the total weight of the joint compound.

2. The method of claim 1 wherein the concentration of the $C_3$-$C_{24}$ hydrophobically modified polygalactomannan is from about 0.3 to about 3% wt.

3. The method of claim 1 wherein the joint compound additionally comprises from about 0.03 to about 5% wt of an additional thickener.

4. The method of claim 1 wherein the ratio by weight between the $C_3$-$C_{24}$ hydrophobically modified polygalactomannan and the additional thickener is in a range of from about 20/80 to about 80/20.

5. The method of claim 1 wherein the $C_3$-$C_{24}$ hydrophobically modified polygalactomannan is selected from the group consisting of: $C_3$-$C_{24}$ hydrophobically modified hydroxyalkyl polygalactomannans, $C_3$-$C_{24}$ hydrophobically modified carboxyalkyl polygalactomannans, $C_3$-$C_{24}$ hydrophobically modified mixed carboxyalkyl and hydroxyalkyl polygalactomannans, and $C_3$-$C_{24}$ hydrophobically modified cationic polygalactomannans.

6. The method of claim 5 wherein the $C_3$-$C_{24}$ hydrophobically modified polygalactomannan is a $C_3$-$C_{24}$ hydrophobically modified hydroxyalkyl polygalactomannan.

7. The method of claim 6 wherein the $C_3$-$C_{24}$ hydrophobically modified hydroxyalkyl polygalactomannan is a $C_3$-$C_{24}$ hydrophobically modified hydroxypropyl cassia.

8. The method of claim 6 wherein the $C_3$-$C_{24}$ hydrophobically modified hydroxyalkyl polygalactomannan is a $C_3$-$C_{24}$ hydrophobically modified hydroxypropyl guar having a hydroxypropyl molar substitution of from about 0.1 to about 3.0.

9. The method of claim 6 wherein the $C_3$-$C_{24}$ hydrophobically modified hydroxyalkyl polygalactomannan is 2-hydroxypropyl-2-hydroxy-3-(2-ethylhexyloxy) propyl cassia.

10. The method of claim 6 wherein the $C_3$-$C_{24}$ hydrophobically modified hydroxyalkyl polygalactomannan is 2-hydroxypropyl-2-hydroxy-3-(2-ethylhexyloxy) propyl guar.

11. A drying joint compound comprising:
    from about 47 to about 68% wt of at least one filler;
    from about 1.0 to about 5% wt of at least one binder; and
    from about 0.2 to about 3% by weight of a $C_3$-$C_{24}$ hydrophobically modified polygalactomannan having a hydrophobic degree of substitution of from about $10^{-5}$ and about $5*10^{-1}$; and
    from 25 to 45% wt of water.

12. The joint compound of claim 11 wherein the concentration of the $C_3$-$C_{24}$ hydrophobically modified polygalactomannan is from about 0.3 to about 3% wt.

13. The joint compound of claim 11 wherein the joint compound additionally comprises from about 0.03 to about 5% wt of an additional thickener.

14. The joint compound of claim 11 wherein the ratio by weight between the $C_3$-$C_{24}$ hydrophobically modified polygalactomannan and the additional thickener is in a range of from about 20/80 to about 80/20.

15. The joint compound of claim 11 wherein the $C_3$-$C_{24}$ hydrophobically modified polygalactomannan is selected from the group consisting of: $C_3$-$C_{24}$ hydrophobically modified hydroxyalkyl polygalactomannans, $C_3$-$C_{24}$ hydrophobically modified carboxyalkyl polygalactomannans, $C_3$-$C_{24}$ hydrophobically modified mixed carboxyalkyl and hydroxyalkyl polygalactomannans, and $C_3$-$C_{24}$ hydrophobically modified cationic polygalactomannans.

16. The joint compound of claim 15 wherein the $C_3$-$C_{24}$ hydrophobically modified polygalactomannan is a $C_3$-$C_{24}$ hydrophobically modified hydroxyalkyl polygalactomannan.

17. The joint compound of claim 15 wherein the $C_3$-$C_{24}$ hydrophobically modified hydroxyalkyl polygalactomannan is a $C_3$-$C_{24}$ hydrophobically modified hydroxypropyl cassia.

18. The joint compound of claim 15 wherein the $C_3$-$C_{24}$ hydrophobically modified hydroxyalkyl polygalactomannan is a $C_3$-$C_{24}$ hydrophobically modified hydroxypropyl guar having a hydroxypropyl molar substitution of from about 0.1 to about 3.0.

* * * * *